(12) United States Patent
Malkiman et al.

(10) Patent No.: US 10,599,496 B2
(45) Date of Patent: *Mar. 24, 2020

(54) END-TO-END APPLICATION TRACKING FRAMEWORK

(71) Applicant: Qwest Communications International Inc., Denver, CO (US)

(72) Inventors: Igor I. Malkiman, Bexley, OH (US); Chauncey G. Powis, Conifer, CO (US); Tyson Matthew Bunch, El Dorado Hills, CA (US)

(73) Assignee: Qwest Communications International Inc., Broomfield, CO (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/796,510

(22) Filed: Oct. 27, 2017

(65) Prior Publication Data

US 2018/0046526 A1 Feb. 15, 2018

Related U.S. Application Data

(63) Continuation of application No. 14/970,944, filed on Dec. 16, 2015, now Pat. No. 9,811,400, which is a continuation of application No. 14/747,228, filed on Jun. 23, 2015, now Pat. No. 9,244,749, which is a
(Continued)

(51) Int. Cl.
| | | |
|---|---|---|
| *G06F 3/00* | (2006.01) | |
| *G06F 9/44* | (2018.01) | |
| *G06F 9/46* | (2006.01) | |
| *G06F 13/00* | (2006.01) | |
| *G06F 9/54* | (2006.01) | |
| *G06F 16/22* | (2019.01) | |
| *G06F 11/34* | (2006.01) | |

(52) U.S. Cl.
CPC .......... *G06F 9/546* (2013.01); *G06F 11/3419* (2013.01); *G06F 11/3466* (2013.01); *G06F 16/22* (2019.01); *G06F 2201/865* (2013.01)

(58) Field of Classification Search
None
See application file for complete search history.

(56) References Cited

U.S. PATENT DOCUMENTS

| | | |
|---|---|---|
| 5,950,003 A | 9/1999 | Kaneshiro et al. |
| 7,194,664 B1 | 3/2007 | Fung et al. |
| 9,098,612 B2 | 8/2015 | Malkiman et al. |

(Continued)

OTHER PUBLICATIONS

T. Parsons, A. Mos and J. Murphy, "Non-instrusive end-to-end runtime path tracing for J2EE systems," Aug. 2006, The Institute of Engineering and Technology, IEE Proc.-Softw., vol. 153, No. 4, pp. 149-161, retrieved from http://ieeexplore.ieee.org/sta.

*Primary Examiner* — Tuan C Dao
*Assistant Examiner* — William C Wood

(57) ABSTRACT

Novel tools and techniques for tracing application execution and performance. Some of the tools provide a framework for monitoring the execution and/or performance of applications in an execution chain. In some cases, the framework can accomplish this monitoring with a few simple calls to an application programming interface on an application server. In other cases, the framework can provide for the passing of traceability data in protocol-specific headers of existing inter-application (and/or intra-application) communication protocols.

20 Claims, 8 Drawing Sheets

Related U.S. Application Data continuation of application No. 13/073,504, filed on Mar. 28, 2011, now Pat. No. 9,098,612.

(60) Provisional application No. 61/428,709, filed on Dec. 30, 2010.

(56) References Cited

U.S. PATENT DOCUMENTS

| | | |
|---|---|---|
| 9,244,749 B2 | 1/2016 | Malkiman et al. |
| 9,811,400 B2 | 11/2017 | Malkiman et al. |
| 2003/0182654 A1* | 9/2003 | Dmitriev ............ G06F 11/3466 717/151 |
| 2005/0066330 A1 | 3/2005 | Kanai et al. |
| 2007/0074170 A1 | 3/2007 | Rossmann |
| 2007/0207800 A1 | 9/2007 | Daley et al. |
| 2008/0195369 A1 | 8/2008 | Duyanovich et al. |
| 2012/0174120 A1 | 7/2012 | Malkiman et al. |
| 2015/0301876 A1 | 10/2015 | Malkiman et al. |
| 2016/0098308 A1 | 4/2016 | Malkiman et al. |

* cited by examiner

| N | Appl. Acronym | Depth | Rec. Type | Service Name | Function Label | Status | Dur. (ms) | Start Time (MDT) | Stop Time (MDT) | Bef. CA | Aft. CA | Own Time | Net & MW |
|---|---|---|---|---|---|---|---|---|---|---|---|---|---|
| 1 | QPortal | 0 | R | BMG: PreSale: Repair: Get Details: Ajax | | Success | 1363 | 2010-09-15 14:26:29.875 | 2010-09-15 14:26:31.238 | 9 | 6 | 15 | |
| 2 | QPortal | 1 | C | PROB:TROUT.RETR | PROBH17 | Success | 1348 | 2010-09-15 14:26:29.884 | 2010-09-15 14:26:31.232 | | | | 4 |
| 3 | TMS | 2 | R | TMS | retrieveTicket | Success | 1344 | 2010-09-15 14:26:30.377 | 2010-09-15 14:26:31.721 | 297 | 453 | 750 | |
| | | | | Business Info: | | Execution Info: Details | Logs | TicketCount: 1 | | | | | | |
| 4 | TMS | 3 | C | QwestRX | retreiveWFAC Ticket | Success | 594 | 2010-09-15 14:26:30.674 | 2010-09-15 14:26:31.268 | | | | 48 |
| | | | | Business Info: Ticket Number: NB140170 | | Execution Info: Ticket Number: NB140170 | | | | | | | |
| 5 | RXNPS | 4 | R | Q.PROBH17.PROBH. TROUT.RETR | normal | Success | 546 | 2010-09-15 14:26:30.216 | 2010-09-15 14:26:30.762 | 1 | 12 | 13 | |
| 6 | RXNPS | 5 | C | callWtaForRetrieve Ticket | wtaFunction | Success | 533 | 2010-09-15 14:26:30.217 | 2010-09-15 14:26:30.750 | | | | |
| 7 | RXNPS | 5 | C | populateCliiValuesFor National | Cor_iDBCall | Success | 73 | 2010-09-15 14:26:30.673 | 2010-09-15 14:26:30.746 | | | | |
| 8 | RXNPS | 5 | C | findByTicketNumber | dBFunction | Success | 3 | 2010-09-15 14:26:30.746 | 2010-09-15 14:26:30.749 | | | | |
| 9 | RXNPS | 5 | C | getByTicketNumber | dBFunction | Success | 1 | 2010-09-15 14:26:30.749 | 2010-09-15 14:26:30.750 | | | | |

FIG. 6

END-TO-END APPLICATION TRACKING FRAMEWORK

CROSS-REFERENCES TO RELATED APPLICATIONS

This application is a continuation application of U.S. patent application Ser. No. 14/970,944 (the "'944 application"), filed Dec. 16, 2015 by Malkiman et al. and titled, "End-to-End Application Tracking Framework", which is a continuation application of U.S. patent application Ser. No. 14/747,228 (the "'228 application"; now U.S. Pat. No. 9,244,749), filed Jun. 23, 2015 by Malkiman et al. and titled, "End-to-End Application Tracking Framework", which is a continuation of U.S. patent application Ser. No. 13/073,504 (the "'504 application"; now U.S. Pat. No. 9,098,612), filed Mar. 28, 2011 by Malkiman et al. and titled, "End-to-End Application Tracking Framework", which is a non-provisional application which claims the benefit, under 35 U.S.C. § 119(e), of provisional U.S. Pat. App. Ser. No. 61/428,709 (the "'709 application"), filed Dec. 30, 2010 by Malkiman et al., and entitled "End-to-End Application Tracking Framework", the entire disclosure of each of which is hereby incorporated by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Over the past several years, computer server functionality has become increasingly modular. The rise of transaction processing, web services, eXtensible Markup Language ("XML") interfaces, and similar technologies has resulted in a situation in which a lengthy execution chain involving one or more application servers, middleware servers, database servers, and/or the like, merely to service a single user request (e.g., an hypertext transfer protocol ("HTTP") GET request from a web browser).

This modularity provides several benefits. For one thing, such modularity allows an application developer to focus on providing a best-of-breed application to handle a single task, confident in the ability of that application to send and receive messages (or other data) with other applications in a standardized format, such as the Simple Object Access Protocol ("SOAP"), the XML Information Bus, the Java Messaging Service ("JMS"), and HTTP messages, to name a few examples. Accordingly, an application developer need not concern itself with building a "soup-to-nuts" solution to solve a particular computing need. Further, this modularity provides far more extensible and maintainable solutions than older, monolithic applications.

This modularity, however, has greatly complicated the task of software instrumentation and performance monitoring. For example, in an execution chain involving several different application components, it can be difficult to monitor the performance (and/or even confirm the execution) of a particular application component to determine, for example, which component is introducing performance bottlenecks and/or preventing the execution chain from completing successfully.

Separate application monitoring frameworks tend to require recoding of the entire application chain to accommodate the monitoring framework, making such solutions both expensive and difficult to integrate with existing solutions. Moreover, such frameworks tend to impose their own performance penalties on the monitored applications, because of the processing overhead required to perform the monitoring.

Thus, there is a need for a lightweight application execution- and performance-monitoring framework. It would be beneficial if such a framework could be implemented in existing environments without requiring extensive application recoding. It would also be beneficial if such a framework could operate without undue impact to the performance of the monitored applications and/or could provide end-to-end monitoring of execution chains.

BRIEF SUMMARY

Certain embodiments provide a framework for monitoring the execution and/or performance of applications in an execution chain. In an aspect of some embodiments, the framework accomplishes this monitoring with a few simple calls to an application programming interface on an application server, which minimizes overhead in the monitored applications and the amount of coding required to implement the framework. In an aspect of other embodiments, the framework provides for the passing of traceability data in protocol-specific headers of existing inter-application (and/or intra-application) communication protocols, allowing the framework to be implemented without affecting application components that cannot accommodate the framework.

In some embodiments, for example, when a calling application component generates a callout to request processing from a called application component, the calling application component first invokes an application programming interface to generate a framework-specific callout log record with details about the actual callout (including, in some cases, a begin time of the callout). When the calling application receives a response from the called application component, it might invoke the application programming interface to store the stop time of the request (e.g., when a response to the request is received), and/or other pertinent data. Similarly, upon receiving the request, the called application component might invoke the application programming interface to generate a framework-specific request log record (which might include a start time of the request, from the perspective of the called application component), and might invoke the application programming interface to register a stop time (and/or other pertinent data) upon finishing the requested processing. This process can be repeated iteratively for multiple steps in an application execution chain.

In some cases, the application programming interface might generate an object (comprising, inter alia, a start time property) to represent a request record or a callout record, and the application programming interface might populate this object with execution-specific property values (including without limitation, a stop time value) upon completion of the execution step. Alternatively and/or additionally, the application programming interface might store the information in a database record, which might be stored in a database remote from the application server on which the application component executes.

In another aspect, the calling application component and the called application component might exchange traceability data using the protocol headers for whatever inter-component messaging protocol happens to be implemented. Merely by way of example, traceability data might be passed as part of a JMS header, an Information Bus header, a SOAP header, an HTTP header, and/or the like. The application programming interface, in some cases, can also be used to store this traceability data in the appropriate record object(s) and/or the database records.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides methods. An exemplary method for establishing a framework for end-to-end traceability and/or performance monitoring of an execution chain might comprise receiving, at a first application component, a request for processing and/or measuring a first start time of the first application component. The method, in some embodiments, might further include storing in a database, a first request record comprising the first start time, the first request record indicating start of execution of the first application component.

In an aspect, the method might comprise measuring a second start time of an application callout and/or storing, in the database, a callout record comprising the second start time, the callout record indicating that the first application component has initiated an application callout to a second application component. In certain embodiments, the method further comprises establishing a parent-child relationship between the first request record and the callout record. In other embodiments, the method might comprise sending application data from the first application component to the second application component, and/or storing, e.g., in the callout record, traceability data about the application data sent from the first application component to the second application component.

The method, in some cases, further comprises measuring a third a start time of execution of the second application component, storing, in the database, a second request record comprising the third start time, and/or establishing a parent-child relationship between the callout record and the second request record.

In a set of embodiments, the method further comprises measuring a first stop time of the second application component, perhaps after execution and/or before the second application passes a response to the first application component, and storing the first stop time in the second request record. Likewise, the method might comprise measuring a second stop time of the application callout after the first application component receives a response from the called application, and/or storing the second stop time in the callout record. Similarly, the method might comprise measuring a third stop time of the first application component, after the first application component returns a response to the request for processing, and/or storing the third stop time in the first request record.

Another exemplary method can be used to measure application load and/or performance, and/or to establish data flow end-to-end traceability. The method might comprise generating traceability data for a first application component before the first application component passes application data to a second application component. The method, then, might further comprise passing the traceability data to the second application component with an auxiliary facility, and/or retrieving the traceability data at the second application component. In an aspect of some embodiments, the method further comprises generating, with the second application component, a database record to indicate that first application passed the message/data to the second application, and/or storing the traceability data in the database record.

As yet another example, a method for implementing an end-to-end application tracking framework might comprise instantiating, e.g., by an application server, a first application component, and/or storing, in a data store, a first start time of the first application component. In some cases, the method comprises instantiating a second application component, and/or storing, in the data store, a second start time for the second application component.

Upon receiving an indication that the second application component has completed execution, the application server might store a first end time of the second application component. The method, then, might include determining a total execution time of the second application component, e.g., based, at least in part, on the difference between the second start time and the first end time of the second application component. Similarly, the method might further comprise receiving an indication that the first application component has completed execution, storing, in the data store, a second end time of the first application component, and/or determining a total execution time of the first application component based, in part, on the difference between the first start time and the second end time of the first application component. In some cases, the method might also comprise displaying the total execution times for the first and second application components.

Another exemplary method might comprise receiving, at a first application component, a first request for processing, and/or creating a first request record (e.g., as a record object, as a database record, etc.) for the first request. The first request record, in an aspect, might include an associated first record identifier. In some cases, the method further comprises generating, in response to the initial request, a callout to a second application component, and a callout record can be created (e.g., in the database) for the callout. In some cases, the first record identifier is assigned as a parent identifier of the callout record, and/or a second record identifier might be assigned (e.g., stored in the callout record) to identify the callout record.

The method might further comprise receiving the callout at the second application component as a second request for processing, and/or creating a second request record for the second request. A third record identifier might be assigned to the request record, and/or the second record identifier might be assigned as a parent identifier of the second request record.

As noted above, other embodiments provide apparatus and/or computer systems. An exemplary apparatus might comprise one or more non-transitory computer readable storage media having encoded thereon one or more sets of instructions executable by one or more computers (e.g., a first set of instructions executable by a first computer and a second set of instructions executable by a second computer) to perform one or more operations. The one or more sets of instructions, for example, might collectively comprise instructions for performing one or more operations in accordance with the methods provided by various embodiments, including without limitation the methods described above. Merely by way of example, one of the computers might perform some of the operations, while another computer might perform others, so that the computers collectively perform the method (or a portion thereof). Alternatively and/or additionally, a single computer might perform the entire method (or a portion thereof). Somewhat similarly, a computer system might comprise one or more processors (which might reside within the same computer or different computers) and one or more computer readable media in communication with the one or more processors. Collectively, the one or more computer readable media might have, encoded thereon, similar instructions, which might be executable by the one or more computers to perform a method (or a portion thereof), such as one of the methods described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 6 is a generalized schematic diagram illustrating a report that can be produced in accordance with various embodiments.

DETAILED DESCRIPTION OF CERTAIN EMBODIMENTS

Figure 1:
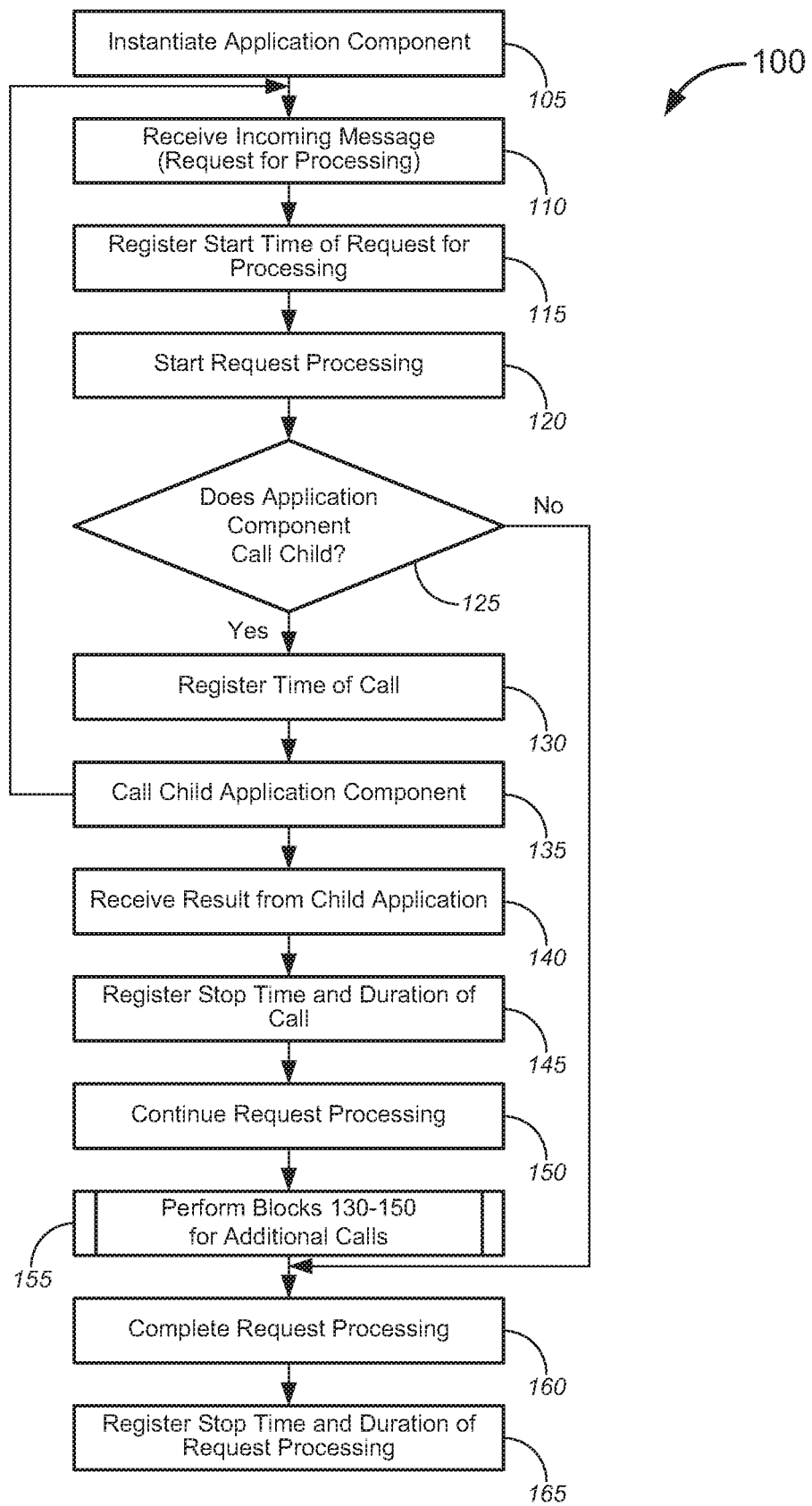
FIGS. 1 and 2 are process flow diagrams illustrating methods for tracking application performance, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Application Tracking Framework

One set of embodiments provides an application tracking framework, which can supply complete, near-real-time complete traces of operation and performance status of applications and application components in production and other environments. The framework allows hierarchical end-to-end tracking of application component (and application component layer) interactions and performance, and tracking of end user activities for web based and non-web based applications for both synchronous and asynchronous interactions.

In one embodiment, the tracking framework is implemented as one or more centralized tracking databases, which may be operated by one or more centralized tracking servers, and a set of APIs that are accessible by application components to generate data according to the tracking framework. In a particular embodiment, for example, these APIs may be used by Java and .NET based applications on each computer where a monitored application component executes.

The terms "application," "application component," and "application component layer" are used interchangeably herein to refer to any discrete software entity that can be employed to perform a desired function. (An "application layer" refers to a specific case of an application component, in which distinct scopes of a single application component exchange data with each other via API calls, much like different application components exchange data using the same API calls, as described in further detail below.) For example, in many cases, a first application component will call a second application component to perform a specific processing function, and the second application component will return a result of that processing to the first application component. In this example, the first and second application components might be components of a single larger application, or they might be separate applications entirely (or components therefore) perhaps executing on different computer systems separated by any distance and communicating, e.g., over the Internet or an intranet. This calling procedure may be performed iteratively, either in series and/or in parallel, as a first application component calls a second application component, which calls a third application component, and so forth. In some cases, one application component might call two other components, again either serially or in parallel. The entire process, including each successive call and return, is referred to herein as an "execution chain," which normally begins with the invocation of a top level component and a return, by that top level component, of a result to the calling entity, which might be a user, a web browser, another application outside the execution chain, etc. The phrase "outside the execution chain" is used herein to refer to an entity that is not subject to the application tracking techniques described herein.

In many cases a first application component will call a second application component by sending a message in a specified format to the second application component. Any of a variety of message formats are possible, including without limitation Hypertext Transfer Protocol ("HTTP") messages, Simple Object Access Protocol ("SOAP") messages or other web-services based messages, eXtensible Markup Language ("XML") messages (including without limitation Information Bus XML messages), are but a few examples of such messages in which the execution tracking techniques of various embodiments may be employed. In other cases, one application component (or application component layer) may call another application component (or application component layer, perhaps within the same application component) through the use of an application programming interface ("API"), and the execution tracking techniques of various embodiments may be used to trace such execution chains as well, although the use of a dedicated API may obviate the need for some of the features provided by various embodiments.

In some embodiments, applications are tracked by tracing "requests" and "callouts," and/or by creating database records to track these entities. As used herein, the term "request" refers to a message or data accepted by an application component, the message or data requesting the receiving application component to perform a processing function (the result of which might be returned as a response to the request). An outgoing message or data passed by a calling application component to a called application component is referred to herein as a "callout." Thus, there is generally a reciprocal relationship between a callout and a request—a single message between a calling application and a called application is considered a callout from the perspective of the calling application and is considered a request from the perspective of the called application. An exception to this relationship is the request received by the first application component in the execution chain, which generally will not have a corresponding callout from a calling application component (since whatever entity called the first application will generally be outside the execution chain and/or may not be instrumented with the framework described herein). Application components may have from zero to many callouts for a given request; conversely, application components may have from one to many requests for a given callout, although there usually may be only one request for a given callout.

Certain embodiments create and/or modify records to track the execution of application components in the execution chain. These records can serve multiple purposes. For example, in some cases, the records can memorialize the execution chain (i.e., can demonstrate that a first application called a second application) if the execution chain is not completed, which can assist in troubleshooting a complex execution chain. Moreover, the records, as described in more detail below, can be used to monitor performance of the execution chain as a whole and/or of components involved in the execution chain.

There are two basic types of records employed by certain embodiments: a begin record and an end record. A begin "request" record is generated by an application component immediately upon receiving a request (in particular embodiments, before any other processing is performed responsive to that request), or immediately before calling another component. An end "request" record is generated by the application component after completing execution to respond to the request message/data (usually before transmitting any response to the calling entity). Likewise, a begin "callout" record may be generated immediately before submitting a callout to a called application component, and an end "callout" record may be generated immediately after receiving the response to that callout. In an embodiment, an application component generates a record (which might be either a begin record or an end record for a request or a callout) using an API call to the tracking server.

In an embodiment, an application generates a record by making an API call to the tracking framework, which creates a record object. The API then may transmit the object (perhaps as a delimited string, such as a comma-delimited string) to a tracking server, which may store the record as a database record, perhaps in the conventional fashion. In one aspect, an application calls the API to generate a begin record immediately after receiving a request (or immediately before sending a callout) and calls the API. Although a variety of record formats (and formatting conventions) are possible within the scope of different embodiments, the table below illustrates a record format for each type of record, in accordance with one set of embodiments:

TABLE 1

Example Layout for Begin Record

| N | Field Name | Value Type | Value | Nullable/ Empty | Max Length |
|---|---|---|---|---|---|
| 1 | Label | String | B—Setup by framework. | N | 1 |
| 2 | Hostname | String | Determined by framework. | N | 64 |
| 3 | Application Server Name | String | Passed as a parameter to framework. | N | 48 |
| 4 | Record Id | GUID-String | Generated by framework. | N | 36 |
| 5 | Parent Id | GUID-String | Set up by framework. Value is empty for initial requests. | Y | 36 |
| 6 | Correlation Id | GUID-String | Set up by framework. | N | 36 |

TABLE 1-continued

Example Layout for Begin Record

| N | Field Name | Value Type | Value | Nullable/ Empty | Max Length |
|---|---|---|---|---|---|
| 7 | Record Type | String | Set up by framework. R—requests; C—callout; S—service. | N | 1 |
| 8 | Application Id | String | Implementation-specific identifier. | N | 40 |
| 9 | Service Name | String | Passed by application component as a parameter to API. | N | 64 |
| 10 | Function Label | String | Passed by application component as a parameter to API. Identifies processing function within component. | N | 64 |
| 11 | UI Session Id | String | Passed by web apps as a parameter to API or set up by framework. | Y | 128 |
| 12 | Sample Frequency | Integer | Passed by application component as a parameter to API. | N | 1-6 |
| 13 | Start Time | String | Set up by framework API. | N | 23 |
| 14 | Stop Time | String | Set up by framework API. Empty string at creation of begin record. | Y | 23 |
| 15 | Duration | Integer | Set up by framework API. Empty string at creation of begin record. | Y | 1-5 |
| 16 | Completion Status | String | Set up by framework API. Empty string at creation of begin record. | Y | 1 |
| 17 | Start Info | String | Can be set up by framework API. | Y | 255 |
| 18 | Supplemental Info | String | Can be set up by framework API. | Y | 255 |

As noted above, the layout for the begin record (and the fields therein) can vary in different embodiments, but for exemplary purposes, this layout is used in several embodiments. In this example, the Label field identifies the record as a Begin record. The Hostname field identifies the host on which the application component executes, and can be determined by the framework (e.g., through conventional operating system calls). The Application Server Name field can be implementation specific, and it can identify a particular specific named server process on a given host (e.g., one of several web application servers, such as WebSphere™ Apache™, and/or the like, some or all of which might be running on a given host).

The Record ID field is generated by the framework, and it is a (e.g., globally) unique identifier of the record. This field, as described elsewhere herein, is used in many embodiments to track an execution chain from request to callout to request, and so forth. For example, the Parent ID field (which also can be a globally unique identifier), which is also assigned by the framework, is blank for the first request in an execution chain, but that field will be populated with the Record ID value for the preceding step(s) in the execution chain. The Correlation ID field is similar (and can also be globally unique), but it is populated with the same value for each record in an execution chain (which might be, in some cases, the Record ID of the first record in the execution chain). The UI Session ID is used in web-based applications, and in some embodiments, that field corresponds to the UISessionID established between a user's web browser and the web server (or web application) that initiated the execution chain. The UI Session ID field thus can allow all of the records in two or more different execution chains to be correlated with a particular end user's browser session. For non-browser-based applications, this field might be left null or omitted altogether.

The Record Type field identifies the type of framework-specific transaction to which the record corresponds—e.g., a request, a callout, etc. The Application ID is implementation-specific, and may be omitted from some embodiments, but if an enterprise uses an applications catalog to register applications components, the Application ID can be used to store the applications catalog's identifier for the application component to which the record relates. This field might be set by the framework, based on a lookup in the applications catalog, or might be passed by the component itself to the API. Other options are possible as well.

Similarly, the Service Name field can be used, based on the implementation, to provide a human-friendly logical name for the application component, and the Function Label can be used to provide a human-friendly logical name for the function within the component that is responsible for processing the request, or that issued the callout, depending on the nature of the record.

The Sample Frequency is an optional field that is used, in some embodiments, to notify the framework of the sample frequency that should be used to monitor that application component's performance. The Sample Frequency might depend on the volume of transactions processed by that application component. For example, for relatively low transaction volume processes, the sample frequency might be 1, meaning that every transaction should be tracked. For high-volume processes, such frequent sampling might create performance problems, so a lower sample frequency, such as sampling one of every 10,000 transactions, might be more efficient. The application component can pass the desired sample frequency to the API as a parameter.

The exemplary record depicted in Table 1 also includes a Start Time field, which can be a Universal Time Coordinated ("UTC") datetime value, among other alternatives. In some embodiments, the framework obtains the current time at the host where the application component executes (e.g., from the host's system clock, etc.) and populates this field with that value, although other alternatives are possible as well. In an aspect, the Start Time field can represent the current time (to an appropriate or available degree of precision) immediately after the request is received or immediately before the callout is made, depending on the nature of the record. The record may also include a Stop Time field and a Duration field. Generally, in a begin record, each of these fields is null. Similarly, the Completion Status field, which can be used to indicate any execution problems, is left empty in a begin record.

An optional Start Info field can be populated by a framework-specific API to store values of function business parameters, which can allow correlation between actual business data and framework-specific load and/or performance data characterizing the processing of that business data. There may also be a Supplemental Info field to hold execution information about the process to which the request or callout relates; this field is generally null in a begin record.

In certain embodiments, an end record has the same (or similar) layout as a begin record. The difference between the two is that an end record generally will also include information that is available only after execution (either of request processing or of a called process) is complete. In some embodiments, in fact, the object that represents the begin record, as created by the framework API, persists until processing of the request/callout is complete, at which point the object is updated by another API call to populate the object with values which become available after processing, such as stop time, duration, status, and supplemental information; this updated object can then be transmitted to the tracking server for storage as an end record.

TABLE 2

Example Layout for End Record

| N | Field Name | Value Type | Value | Nullable/ Empty | Max Length |
|---|---|---|---|---|---|
| 1 | Label | String | E | N | 1 |
| 2 | Hostname | String | Determined by framework. | N | 64 |
| 3 | Application Server Name | String | Passed as a parameter to framework. | N | 48 |
| 4 | Record Id | GUID-String | Generated by framework. | N | 36 |
| 5 | Parent Id | GUID-String | Set up by framework. Value is empty for initial requests. | Y | 36 |
| 6 | Correlation Id | GUID-String | Set up by framework. | N | 36 |
| 7 | Record Type | String | Set up by framework. R—requests; C—callout; S—service. | N | 1 |
| 8 | Application Id | String | Implementation-specific identifier. | N | 40 |
| 9 | Service Name | String | Passed by application component as a parameter to API. | N | 64 |
| 10 | Function Label | String | Passed by application component as a parameter to API. Identifies processing function within component. | N | 64 |
| 11 | UI Session Id | String | GUID. Passed by web apps as a parameter to API. | Y | 128 |
| 12 | Sample Frequency | Integer | Passed by application component as a parameter to API. | N | 1-6 |
| 13 | Start Time | String | Determined by framework. | N | 23 |
| 14 | Stop Time | String | Determined by framework. | Y | 23 |
| 15 | Duration | Integer | Determined by framework. | Y | 1-5 |
| 16 | Completion Status | String | Passed by application component as parameter to API. | Y | 1 |
| 17 | Start Info | String | As was set by API. | Y | 255 |
| 18 | Supplemental Info | String | Passed by application component as parameter to API. | Y | 255 |

As can be seen by a comparison of Tables 1 and 2, in the exemplary embodiment, the record format for begin and end records is essentially the same (although this is not required), and in some cases, generating an end record, as mentioned above, may merely comprise calling the framework API to update the record object with information available after processing has completed, although there may be two discrete records transmitted to the tracking server and/or stored in the tracking database for each record object—a begin record and an end record.

Thus, for example, the exemplary end record has a different value ("E") for the Label field, indicating that the record is an end record, rather than a start record. The End Record also has values for the Stop Time field and the Duration field (which might simply be an arithmetic subtraction of the start time from the stop time). The end record may also have a value for the Completion Status field (which may be a parameter passed by the application component to the API for error handling purposes) and/or the Supplemental Info field (which may be a parameter passed by the application component to the API to provide any transaction-specific information, which can be shared among application components and/or stored in the tracking database).

How the respective begin and end records are stored in the database is implementation-specific. In some cases, the begin record might be deleted when the end record is received. In other cases, the appropriate fields of the begin record might be updated with values from the end record, while in still other cases, the begin record and the end record might be stored as different records. (In an aspect of some embodiments, if a begin record exists without a corresponding end record, or if a begin record has not been updated with data from an end record, that inconsistency can be used to identify processes that did not successfully complete execution.)

As can be seen from the examples above, an execution chain can be considered hierarchical in nature, with an application component hierarchy existing from requests to callouts and from callouts to requests. For example, upon receiving an initial request (from outside the execution chain) an application component will call the tracking server (e.g., as a call to a tracking framework API on the machine on which the application component executes) to generate a begin record for the request (referred to herein as a "Request Record").

If the first application component needs to call a second application component, the first application component will call the tracking server again to store a begin record for the callout (referred to herein as a "Callout Record"). When calling the tracking server to store a Callout Record, the application component will often pass, as a parameter of the call, the Record ID of the Request Record. (Alternatively, if the respective calls to the tracking server to store the Request Record and the Callout Record are made as part of the same execution thread at the machine on which the application component runs, the Record ID of the Request Record may be maintained in the machine's thread store, which can be accessed by the API, and therefore need not be passed as part of the call by the application component.) The API, then, will generate the Callout Record with a start time of the callout (which, again, might be a UTC value but might be obtained locally at application component). The API will also assign, as both the Correlation ID and the Parent ID in the Callout Record, the Record ID of the Request Record. In this way, the Callout Record is linked to the Request Record, and it can be considered a child of the Request Record. The record type of the Callout Record will be "C".

Upon receiving the call from the first application component, the second application component, from whose perspective the call is a request, will call a messaging platform-specific API to generate a second Request Record. The Record ID of the Callout Record may be passed as part of the call, and that Record ID of the Callout Record will be assigned as the Parent ID of this new Request Record. The Correlation ID and/or UI Session ID will be the same. Accordingly, this new Request Record will be identified as a child of the Callout Record and as part of the same execution chain as both the first Request Record and the Callout record. This new Request Record will be assigned a start time corresponding to the time the request was received at the second application component. This process can be repeated consecutively for each callout in the execution chain, e.g., if the second application component needs to call a third application component, it will call the API to generate a new callout record, the third application component will call the API to generate a new request record, and so forth.

When an application component finishes processing the request, it will call the API to generate an end record for that request. As noted above, in some embodiments, the end record will essentially be identical to the corresponding begin record for the request, except that it will include a stop time. The end record may also include some execution related-data (such as exception handling data, etc.). Similarly, when a calling application component receives a result from a called application component, the calling application component will call the API to generate an end record for the callout, generally immediately after receiving the response from the called application.

In operation, the Parent ID value allows for end-to-end traceability of data/messages flow from component to component. The UI Session ID value allows for tracing of end user activities in web based applications. Its value will be the same across framework records associated with different hierarchical chains for different initial requests within the same user session. Similarly, the Correlation ID value allows for tracing of end user activities in non-web based applications. Its value will be the same across framework records associated with different hierarchical chains for different initial requests within the same instance of application execution.

Generated request and callout records thus can be collected and processed to compute the request and callout durations and establish a trace of execution from request to callout in the calling application and from the callout in the calling application to the request in called application. Since the called application often plays dual roles and calls another application use of this framework allows us to establish end-to-end trace of execution in diverse and complex interaction patterns.

The framework allows for reliable load metrics collection. Each begin request and callout record accounts for one data/message to be processed by application/application component. In case when framework is not fully implemented and end records are not logged, collection of begin records still allows for load measurement. Further, the framework can provide a light weight approach for performance metrics collection. Duration of requests and callouts can be computed outside of application/application components by processing start and stop records with the same Record ID.

For example, comparison of a request start time and a corresponding (child) callout start time can be used to measure load of an application receiving the request and issuing the callout, while comparison of a callout start time and a corresponding (child) request start time can be used to measure communication responsiveness (and/or network latency, etc.) between a calling application and a called application. Similar metrics can be developed for called application performance (difference between start time and stop time) and/or the like.

Inter-Application Communication and Reporting

Other embodiments can provide a light-weight, non-intrusive approach for passing traceability and auxiliary data from a calling application/application component to a called application/application component to enable metrics data generation according to framework described above.

In an aspect, certain embodiments utilize existing auxiliary facilities (including, but not limited to, protocol headers) for sending status and/or timing information between applications (e.g., on behalf of the tracing framework described above). Such an implementation reduces the total impact on the operation of the applications and application components. Thus, while the business data and/or messages (collectively referred to herein as "application data") may be sent as payload between application components, the auxiliary facilities associated with the mode of inter-component communication can be used to pass traceability and auxiliary data.

For example, the header of the SOAP protocol may be used to store tracking information. Such information may include a correlation ID, record ID, parent ID, etc. Because such embodiments use the SOAP (or other existing) protocol, there is no need to change the schema or payload of applications, and so there is very little impact on operations of the applications. The implementation of such a tracking framework also becomes very transparent because no new or additional protocols are needed to implement such functionality. Furthermore, because the framework uses existing protocol headers to transport information, the overall impact on the operation of the applications is minimal.

Thus, the approach employed by various embodiments involves passing of traceability data, such as the Parent ID, UI Session ID, Correlation ID described above (and/or auxiliary data) without requiring any change to business application programming interfaces.

The traceability data and auxiliary data may be passed from calling application/application component to called application/application component by means of different protocols infrastructure and data exchange. The examples include but are not limited to: HTTP headers for HttpRequest to called application, SOAP headers for calls to web services, JMS headers for JMS calls, Bus headers for calls to Information Bus responders, HTTP Request parameters, a data set placed on a queue, and/or the like.

Example Implementations

FIGS. 1-8 illustrate several exemplary embodiments, and it should be noted that the features of the embodiments in conjunction with FIGS. 1-8 can be combined in any suitable fashion without varying from the scope of yet other embodiments.

FIG. 1 illustrates, in general, a method 100 of tracking application performance and/or inter-application communications. At block 105, an application component is instantiated (the application component, as referred to in this example, might be a standalone application or a component of a larger application). At block 110, the application component receives an incoming message or data, which represents a request for processing by the application component. (This request might be received from any of a variety of entities within or outside the execution chain, as described elsewhere herein). At this point, a start time for the first applications is registered (block 115) (e.g., by a process described in further detail below). The application component then begins the requested processing in order to service the request (block 120). The application component determines whether it can service the request on its own, or whether it needs to call a child application (which might be a separate application, a separate component in the same application, or even a recursive call to the same process), as represented by decision block 125.

If another application component is to be called, the calling application component registers the time immediately before the call (block 130) and then calls the child application component (block 135). From the perspective of the child (called) application component, this reiterates the process, beginning with receiving the incoming message (block 110). From the perspective of the parent (calling) application component, the application component waits for a result of the call, and when that result is received from the child component (block 140), the parent application component registers the stop time of the call and/or the duration of the call (block 145).

The parent application component then performs any necessary additional processing to satisfy the request (block 150), and if any additional calls to the same or other child applications are necessary, the parent application component can repeat the procedures described above with respect to blocks 130-150, as shown by block 155. After the request processing is complete (block 160), the parent application component registers the stop time and/or duration of its own processing (block 165), at which point it might return a result to the entity from which it received the incoming message, and control might return to that entity.

Figure 2:
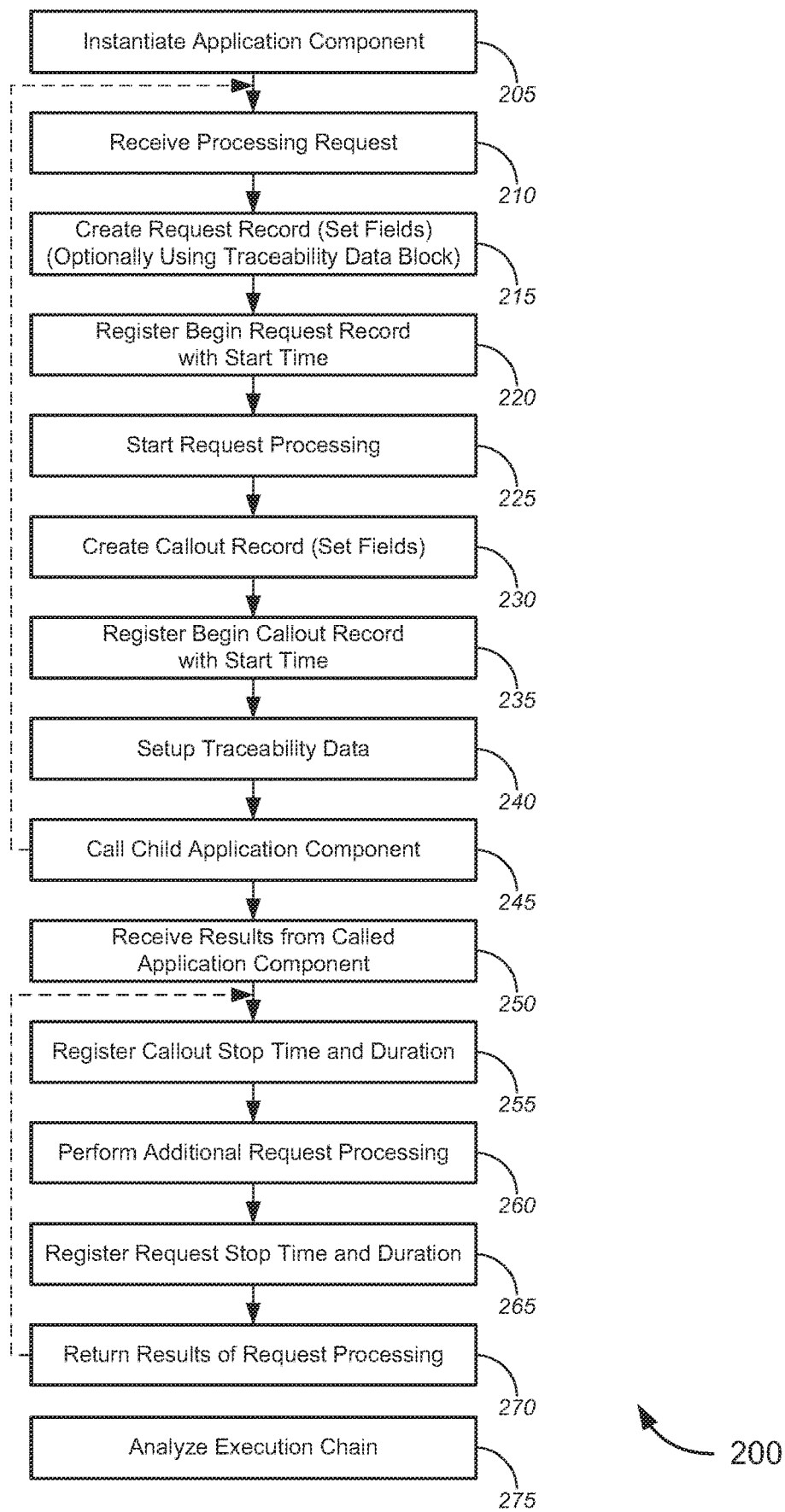

FIG. 2 illustrates an application monitoring method 200 in somewhat more detail. The method 200 comprises instantiating a first application component (block 205). At block 210, the first application component receives a processing request. If the application component is the first application component in an execution chain, the application component may receive the request from any entity outside the execution chain (including, without limitation, a user; a web browser; another, non-monitored application or component; etc.). Alternatively, as described further below, the application component might be a child application component that receives a processing request from a parent application component as part of the execution chain. In either case, the behavior of the application component can proceed as described with respect to the remainder of the method 200.

At block 215, a Request Record is created for the request, and the fields of the Request Record are set. In some cases, as described above, the creation of a Request Record might comprise the instantiation of a record object using the tracking framework API, although non-object-oriented records may be used in accordance with other embodiments. Some of the field values of the record object may be set by the tracking framework, while others may be passed to the API via the application component. (Examples of such behavior are described above with respect to Table 1, although other options are possible as well.) At block 220, the Request Record is populated with a start time (as described above, for example), and a begin Request Record may be registered with the tracking server. It should be noted that, in some embodiments, the creation of the Request Record and the registration of the begin record for the request are performed as part of the same API call, and/or both operations are performed nearly simultaneously, although this is not required.

At block 225, request processing begins in the first application component. The request processing essentially involves any operations that are necessary or proper to perform the work requested by the incoming message and/or to produce the result requested by the incoming message. In many cases, request processing will begin immediately following the registration of the begin record (with a start time); it is in the application component developer's best interest to begin processing without delay after the start time is registered, so as to not unduly malign the performance metrics of the application component. Other circumstances might necessitate a delay between the registration of the begin record and the commencement of processing, however, and this can be supported as well. In most embodiments, however, the request processing cannot begin until the begin record has been registered, so as to prevent the application component's developer from unfairly manipulating the performance metrics in favor of the application component.

If the first application component needs to call one or more child application components, the sub-process illustrated by blocks 230-255 may be performed iteratively, in series or parallel, as necessary. Although FIG. 2 is described only with respect to a single child application component, it should be appreciated that any number of calls to one or more different child application components might be performed in various implementations. Conversely, in some cases, an application component might not call a child application component at all (e.g., of that application component is the last component in an execution chain).

At block 230, the first application component creates a Callout Record object and sets the fields in that object, e.g., as described above with respect to the Request Record. At block 235, the first application component registers the begin time for the callout (e.g., by populating a Start Time field in the Callout Record and registering a begin Callout Record with the tracking server). As noted above, the Parent ID of the Callout Record often will be populated with the Record ID of the first application component's Request Record, while the Correlation ID and/or UI Session ID fields often will be populated with the values from the corresponding fields in the Request Record (any of which may be passed as a parameter to the framework API when calling the API to generate the Callout Record).

At block 240, the first application component sets up any necessary traceability data, as described further below, and at block 245, the first application component calls a second (child) application component. It should be noted that, in some embodiments, design guidelines require developers to develop application components in such a way that the registration of the begin Callout Record is performed immediately prior to calling the child application, so as to record the performance of both the calling application component and the called application component accurately (for example, to prevent the calling application component from registering a callout start time in advance of calling the child application component and thereby attributing some of its own processing time to the child application component's recorded execution duration).

As noted above, the first application component may call the second application component in a variety of ways, any of which can be considered a message, in accordance with various embodiments. Thus, from the perspective of the second (child) application component, the method 200 reiterates from block 210 when the child application component receives this message. As noted above, in some embodiments, some of the values of the fields in the Request Record object created by a child application component will depend on corresponding fields in the Callout Record of the parent application component, which may be passed, for example, in the header of the message used to call the child application, as described elsewhere herein. Merely by way of example, the Record ID of the Callout Record generated by the parent application component will be used as the Parent ID of the child application component's Request Record, while the same Correlation ID and/or UI Session ID may be used in both records.

From the perspective of the first application component, the method 200 continues, and when the first application component receives a result from the second (child) application component (block 250), the first application component registers a callout stop time and duration. This operation might comprise, for example, calling the framework API to populate a Stop Time field and/or a Duration field in the Callout Record object (as well as populating any additional fields with execution information, which might be passed as parameters of the API call). This API call might also cause the framework to send an end Callout Record to the tracking database.

At block 260, the first application component performs any additional processing necessary (which, as noted above, might involve calling other child applications, e.g., using the sub-process illustrated by blocks 230-255). When the first application component finishes the requested processing, it registers a request stop time (e.g., by calling a framework API to populate a Stop Time field, a Duration field, and/or any other appropriate fields in a Request Record object and/or to submit an end Request Record, perhaps comprising the updated fields, to a tracking database). The first application component then might return a result of the requested processing to the calling entity (block 270). This result can comprise any appropriate data calculated or generated by the processing, a return code, and/or any other appropriate message or information.

Although FIG. 2 is described above as if the first application component is the first step in a monitored execution chain, it should be appreciated that, if the first application component is not the first step in the monitored execution chain (i.e., if the first application component was called by another monitored application component), the other application component might perform the sub-process of blocks 255-270 as well.

At block 275, the method 200 can include analyzing the entire execution chain, and/or portions thereof. Merely by way of example, by comparing start and stop times, the duration of each step in the execution chain can be determined, and application loads and performance bottlenecks can be identified. Merely by way of example, in an aspect, the duration of callout from the standpoint of calling application is the time interval between blocks 255 and 235; the duration of the request processing from the standpoint of called application for this callout is the time interval between blocks 265 and 220 of the called application; then, the time spent on middleware and data transmission over network between calling and called applications is the difference between first and second durations. In some cases, the method 200 might further comprise providing output of the analysis. One example of providing such output is displaying and/or printing a report, such as the report illustrated by FIG. 6, described in further detail below.

Figure 3:
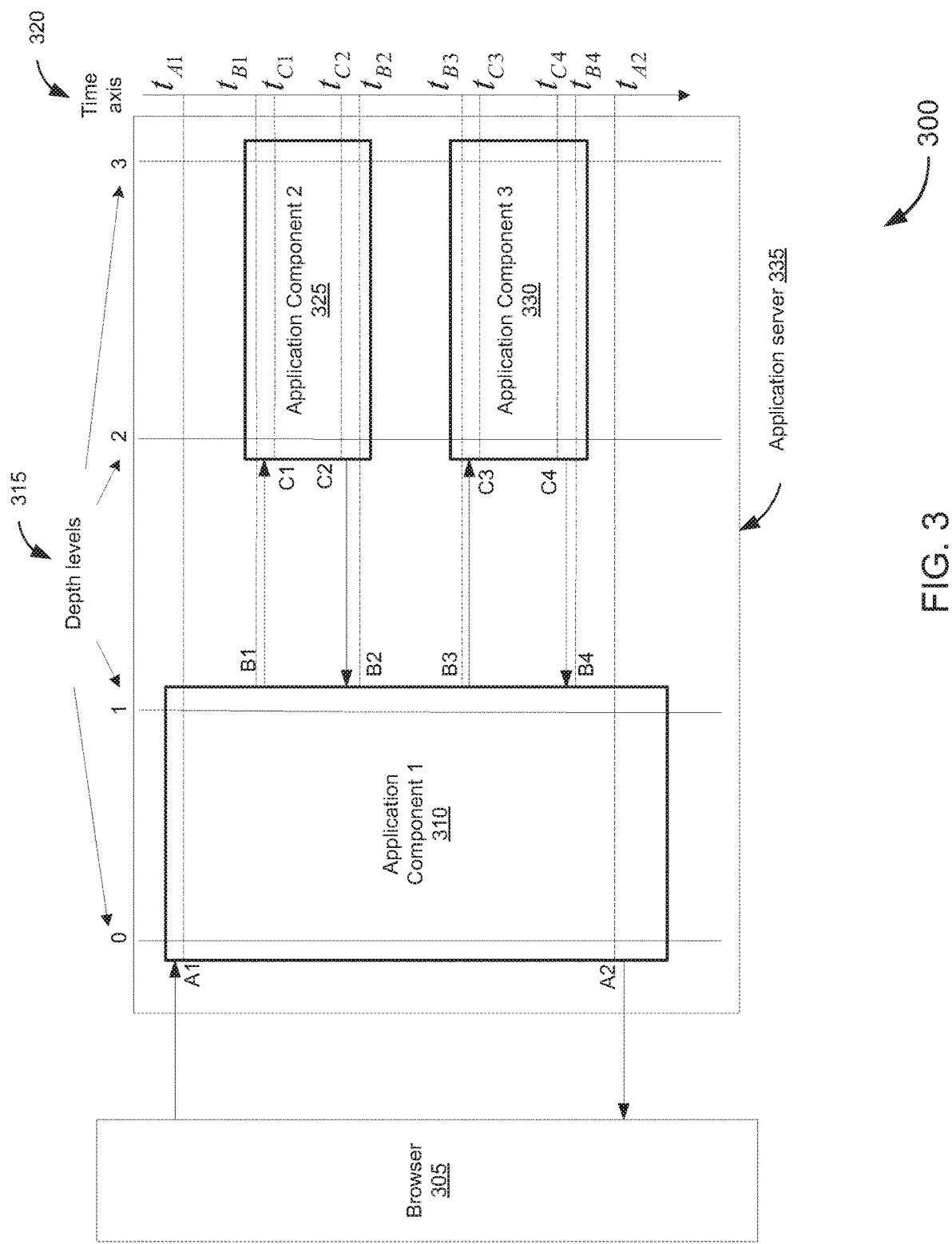
FIGS. 3 and 4 are block diagrams depicting application server systems and illustrating application execution chains, in accordance with various embodiments.

FIG. 3 illustrates schematically an execution chain 300 in an application server environment. A web browser 305 (or other entity) transmits a request to a first application component 310. Immediately upon receiving the request, the first application component 310 generates a Request Record (e.g., a begin record) denoted on FIG. 3 as A1 at time $t_{A1}$. The first application component calls a second application component 325 and a third application component 330.

Before calling the second application component 325, the first application component 310 generates a Callout Record (e.g., a begin record) denoted B1 at time t11, measures callout stop time and sets up traceability data (e.g., as described above with respect to blocks 230-240). Similarly, the first application component 310 generates a Callout Record (e.g., a begin record) denoted B3 (and/or performs the operations described at blocks 230-240 above) at time $t_{B3}$. When the second application component receives the request, from the first application component 310, it generates its own Request Record (begin record) C1 (and/or performs operations such as those described above at blocks 215-220) at time $t_{C1}$. Similarly, when the third application component 330 receives the request from the first application component 310, it generates its own Request Record (begin record) C3 (and/or performs operations such as those described above at blocks 215-220) at time $t_{C3}$.

When the second application component 325 finishes processing, it generates an end Request Record C2 (e.g., as described above with respect to blocks 265-270 above) and provides its results to the first application component 310, which generates an end Callout Record B2 (corresponding to the begin Callout Record B1), e.g., as described above at blocks 250-255, at time $t_{B2}$. Likewise, when the third application component 330 finishes execution, it generates an end Request Record C4 (corresponding to the begin Request Record C3) at time $t_{C4}$, and, upon receiving the response from the third application component 330, the first application component 310 generates an end Callout Record B4 (corresponding to the begin Callout Record B3) at time $t_{B4}$. After performing any additional processing to satisfy the browser's 305 request, the first application component 310 generates an end Request Record A2 (corresponding to begin Request Record A1), e.g., as described at blocks 265-270 above, at time $t_{A2}$ and provides the requested response to the browser 305.

It should be noted that, in certain embodiments, the end records described above are generated immediately before the response to the request is provided to the calling entity, and, that each end record may be formatted as described above. For example, the end record generally will have associated therewith (and/or stored therein) the corresponding stop time of the application component's execution (in the case of a request record) or corresponding stop time of the callout, i.e., the time at which the response was received from the called application component (in the case of a callout record).

It should also be noted that, while this description refers to "generation" of begin and end records, this procedure may be performed in several ways. Merely by way of example, in some cases, as described above, generating a begin record might comprise calling a framework API to generate a record object (e.g., a Request Record object or a Callout Record object), to populate fields in that object, and/or to transmit a representation of that object (e.g., a comma-delimited string comprising the fields of the record object) to a tracking database. Likewise, a new end record may be generated by calling the framework API to update the relevant record object (i.e., the record object created by calling the API to generate a begin record) to populate Stop Time, Duration, and/or other execution-specific fields, and/or to send a representation of the updated record object to a tracking database for storage, also as described above. In general, however, any procedure that results in the recording of start time, stop time, and/or other relevant information in a fashion that allows for later analysis can be considered generating a begin record or an end record, respectively.

The start and stop times of each step in the execution chain 300 can be used to measure performance (and/or assure execution) or each monitored step in the execution chain. For example, using the nomenclature of FIG. 3, the execution time of the overall process can be measured by $t_{A2}-t_{A1}$, the execution time of application component 325 can be measured by $t_{C2}-t_{C1}$, and the execution time of application component 330 can be measured by $t_{C4}-t_{C3}$. The callouts to the second and third application components, 325 and 330 respectively, can be performed in serial or parallel fashion, as required by the specific implementation. As illustrated, all of the application components 310, 325, 330 reside on a single application server 335, but they easily could be separate applications and/or could reside on separate application servers in different embodiments.

Figure 4:
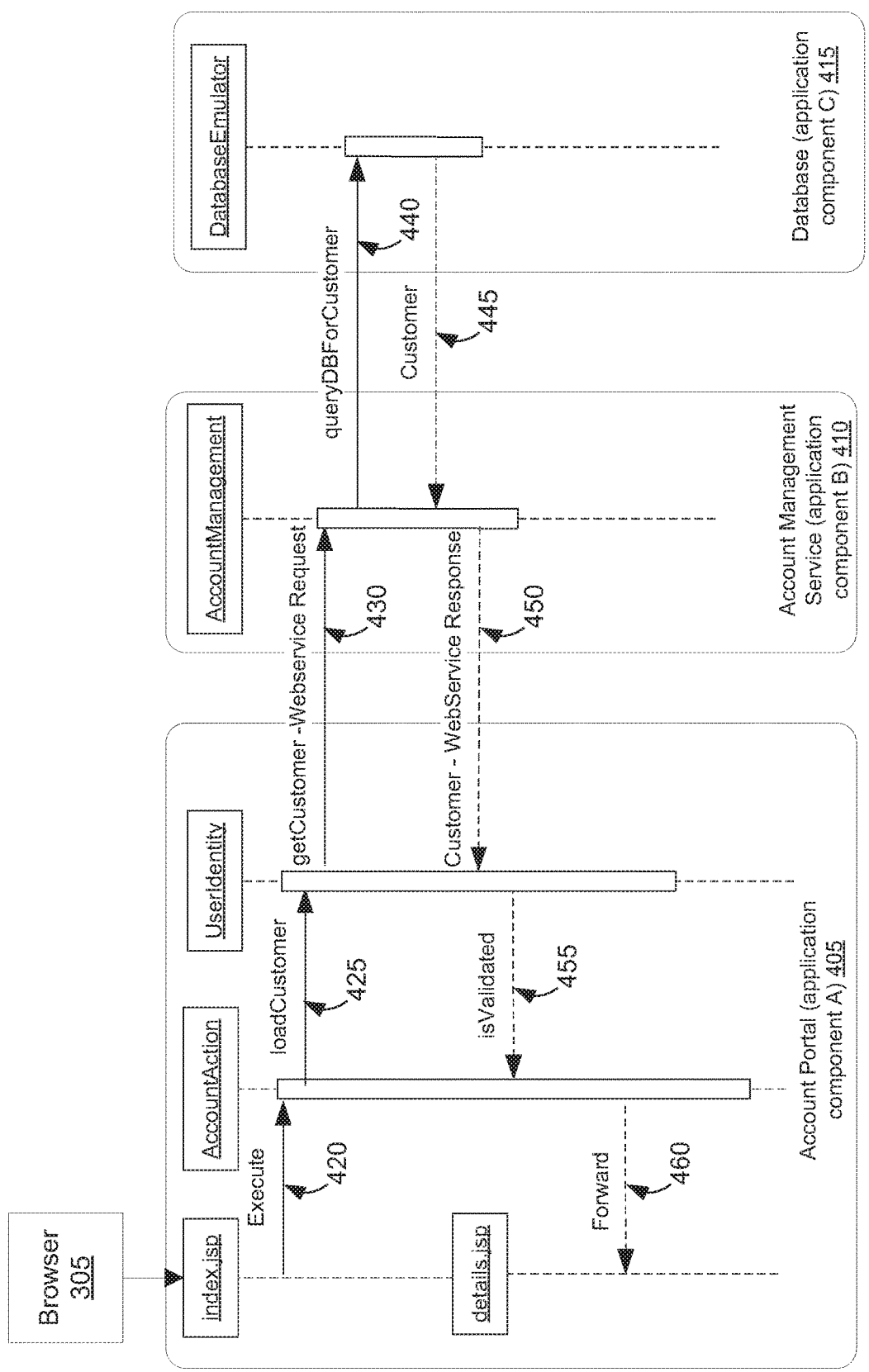

While FIG. 3 illustrates an abstract depiction of a conceptual execution chain, FIG. 4 illustrates a more detailed view of an execution chain 400 involving the browser 305, an account portal 405, an account management service 410, and a database 415. While FIG. 4 does not include a time axis, one skilled in the art can appreciate that a time axis similar to the axis depicted on FIG. 3 could be used to measure the timing and performance of the execution chain 400 on FIG. 4.

The execution chain 400 begins which the browser provides a request (e.g., an HTTP request, such as a login request with the required credentials) to the account portal 405, using perhaps a form on a page titled "index.jsp." Upon receiving the request, the account portal creates a begin Request Record (comprising a start time, as described above) and executes (step 420) an Account Action function, which implements a loadCustomer operation in a UserIdentity function (which might, for example, authenticate the user with the supplied credentials). This function creates a begin Callout Record (with another start time), which might be a child of the Request Record, and makes a callout 430 (in the form of a web service request called getCustomer, which might include a userid value of the user's credentials) to the account management service 410, which in turn creates its own begin Request Record (with a start time), which may be a child of the Callout Record. (Each of these records, as well as those described below, might comprise content similar to, and/or follow formatting conventions similar to, those described above.)

The account management service 410 requires data from the database 415 to service the request from the account portal 405, so it creates a new begin Callout Record (again, with its own start time), which might be a child of the Request Record it created, and makes a call (in the form of a database query 440, which might be, for example a SQL query on the supplied userid) to the database 415. The database 415 (which may be a database management system, such as a relational database management system), upon receiving the query, creates its own begin Request Record (with a start time), which may be a child of the callout record created by the account management service 410, performs the requested query, generates an end Request Record with a stop time, and returns a response 445 (e.g., a set of one or more of the customer records comprising the requested information, such as a customer record having the supplied userid as a key field). The account management service 410, upon receiving the response 445 from the database 415, generates an end Callout Record with a stop time, performs any additional processing needed to service the request 430 from the account portal, generates a Request Record with a stop time, and provides a response 450 (e.g., customer data, perhaps including a password hash, from the record(s) obtained from the database 415) to the web service request from the account portal.

Upon receiving the response 450, the account portal generates an end Callout Record with a stop time, and the UserIdentity function performs any additional processing (e.g., authentication of the userid with the supplied password hash), and returns a response 455 to the AccountAction function indicating that the user has been authenticated and/or authorized. The AccountAction function then creates a response 450 (e.g., details.jsp) which can be provided to the browser 305 and generates an end Request Record with a stop time.

The execution chain 400 may have additional features as well. For example, if desired, each function in the account portal 405 might create request and/or callout records when calling other functions in the account portal 405 (and/or after being called, as appropriate). Additionally and/or alternatively, each step in the execution chain might include, with the callout or response, traceability data which can allow for more detailed tracing of the execution chain, for example, to identify performance bottlenecks, etc.

Figure 5:
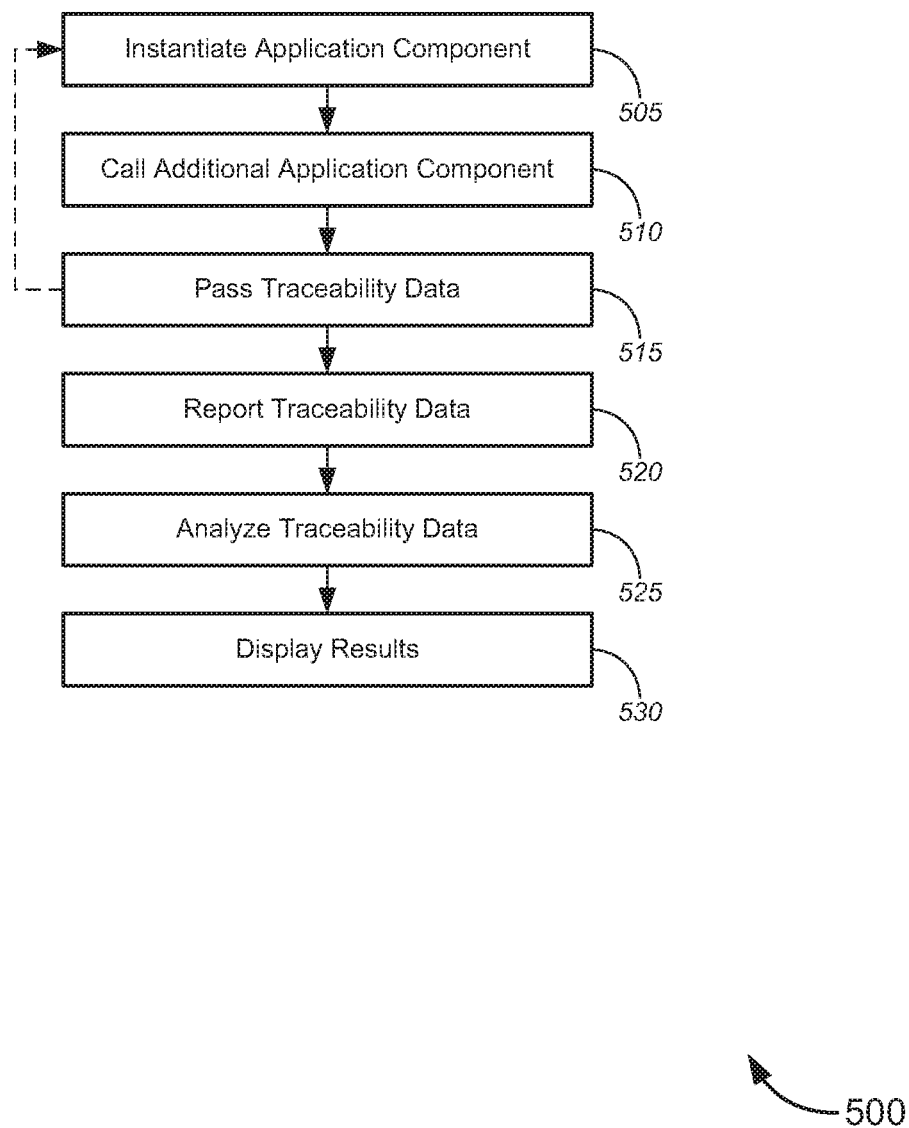
FIG. 5 is a process flow diagram illustrating a method of passing and using traceability data between applications, in accordance with various embodiments.

FIG. 5 illustrates a method 500 by which traceability data can be passed and/or used for analysis. The method 500 comprises instantiating a first application component (block 505). The operation of instantiating an application might take any of several forms, depending on the nature of the first application. The web browser request described with respect to FIG. 4, above, is one example of an action that could instantiate an application.

At block 510, the first application calls a second application using an appropriate protocol (HTTP, SOAP, etc.). In accordance with the illustrated embodiment, the first application passes traceability data to the second application using any auxiliary facilities (e.g., protocol headers) associated with the protocol used to make the call (block 515). This can include, for example, traceability data set up according to the process described with respect to FIG. 2, such as fields from a request and/or callout record (e.g., Record ID, Correlation ID, and/or UI Session ID fields) as well as any other information that can be used to trace execution between different steps in the execution. In a novel feature of some embodiments, available space in the protocol headers can be used to carry a payload of traceability data without varying from the published protocol. In this way, these embodiments can provide enhanced traceability functions while still adhering to the protocol (i.e., so as not to break compatibility with other components that are not configured to operate in this enhanced manner). At block 520, the method 500 comprises reporting the traceability data. In some respects, this operation can comprise sending the traceability data to the tracking database (e.g., as part of a begin record and/or end record for a request and/or a callout).

At block 525, the traceability data is analyzed, and at block 530, a result of the analysis is displayed. In one embodiment, for example, the report of the analysis might comprise a report such as the report illustrated by FIG. 6, described below in further detail.

The traceability data allow certain embodiments not only to build a hierarchical, end-to-end execution chain but also, in some cases, to identify the origin of initial request processed by a given application component. For example, different systems reusing the same application component will have different initial Request Records with corresponding Record IDs. Since the Correlation ID of Request Record is assigned to the Record ID of the initial Request Record (which, as noted above, can be globally unique), the Correlation ID may be used to filter framework data to identify data associated with a particular system that generated them.

It should be noted that, while the method 500 contemplates two applications (or application components), different embodiments can employ any reasonable number of applications/components, and can pass traceability data as far along the execution chain as desired, using protocol headers in callout requests and responses, as appropriate. Thus for example, the method 500 could be employed in conjunction with the execution chains depicted in FIGS. 3 and 4.

More generally, FIGS. 1, 2, and 5 illustrate various methods that can be used to monitor and/or track application performance. While the methods of FIGS. 1, 2, and 5 are illustrated, for ease of description, as different methods, it should be appreciated that the various techniques and procedures of these methods can be combined in any suitable fashion, and that, in some embodiments, the methods depicted by FIGS. 1, 2, and 5 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 1, 2, and 5 can be implemented by (and, in some cases, are described below with respect to) the systems 700 and 800 of FIGS. 7 and 8 below and/or the execution chains of FIGS. 3 and 4 above (or components thereof), as well as the systems/execution chains depicted in the Appendix of the '709 application (which is incorporated herein by reference), these methods may also be implemented using any suitable hardware implementation or application framework. Similarly, while the systems/execution chains (and/or components thereof) described herein and in the Appendix of the '709 application can operate according to the methods illustrated by FIGS. 1, 2, and 5 (e.g., by executing instructions embodied on a computer readable medium), the systems/execution chains can also operate according to other modes of operation and/or perform other suitable procedures.

As noted above, various embodiments provide different types of output for a user. Such output may take many forms, including such things as alarms (e.g., electronic mail warnings if performance or execution problems arise), scheduled and/or ad hoc reports, and the like, and may be produced electronically, in print, and/or by any other suitable technique. FIG. 6 illustrates a report 600 that can be produced in accordance with one set of embodiments, although many other types of reports are possible as well.

The exemplary report 600 of FIG. 6 displays information for a single execution chain, which comprises nine transactions between three different application components. The exemplary report 600 is formatted as a table, with a header row 605 and a plurality of data rows 610, each of which provide data about either a request or a callout (using, for example, information obtained from relevant Request Records and Callout Records, as described above). There are also two rows 615 that display supplemental information obtained by the tracking framework.

The exemplary report 600 also comprises several columns 620, each of which provides relevant information gleaned from the database records for each interaction between a calling application and a called application (these columns 620 are only relevant to the callout/request rows 610, not to the supplemental information rows 615.

In the exemplary report, there is a column 620*a* that lists, for each transaction in the execution chain, the ordered number of the transaction along the execution chain. There is also a column 620*b* that lists the name of each application component (or an identifier thereof), a column 620*c* that describes the depth, within the hierarchy of the execution chain, of each transaction, a column 620*d* that describes the record type (e.g., Request Record, Callout Record, etc.), columns 620*e* and 620*f*, respectively, that provide the service name and function name that received the request or issued the callout in each application component, a column 620*g* that indicates whether the attempted transaction was successful, and several columns 620*h*-620*n* that provide performance-tracking information.

For example, one column 620*h* in the exemplary report displays (in milliseconds, in the illustrated example) the duration of each step in the execution chain. Because each step in the execution chain is subsidiary to the initial request received by the first application component in the execution chain (which, in the illustrated case, is the QPortal application component), the listed duration includes not only that component's execution time, but also the execution time of every other component in the chain (as well as network latency). Indeed, for each serial step in the execution chain, the duration listed in column 620*h* will include the durations of each subsequent step. Note, however, that this may not be the case for steps performed in parallel, or steps otherwise at the same hierarchical level of the execution chain. Thus, while the duration of the transaction represented by row 610*e* will include the durations of the transactions represented by rows 610*f*-610*i*, the duration of the transaction represented by row 610*f* will not include the duration of the transactions represented by rows 610-610*i*, because those transactions, represented by rows 610*f*-610*i*, are all at the same level of the hierarchy, indicating that all of the transactions were separate callouts from the RXNPS application component (which may have been performed serially and/or in parallel).

The duration of a particular transaction, as shown by column 620*h*, can be calculated, in some cases, by subtracting the start time of the transaction (depicted by column 620*i*) from the stop time of the same transaction (depicted by column 620*j*). Taking the first request (represented by row 610*a*) as an example, the actual execution time attributable to the QPortal application component in processing that request can be measured by measuring the difference between that application component's start time and the start time of the subsequent callout (represented by row 610*b*), which measures pre-callout processing, plus the difference between the stop time of that callout and the stop time of the request itself, which measures post-callout processing. These two values are displayed in columns 620*k* and 620*l*, respectively, and the sum of these values, which represents the actual execution time of the QPortal application component in performing the requested processing (without considering processing performed by child application components), is displayed in column 620*m*. Similar data is displayed for other displayed requests in the execution chain (which are represented by rows 610*c* and 610*d*, respectively).

In order to obtain an accurate view of the performance of each application component, the network and middleware latency (which consists of the difference between the duration of a callout, from the perspective of the calling application, and the request, from the perspective of the called application), can be accounted for. Thus, although the duration of the callout represented by row 610*b* is 1348 ms, the time required to process the corresponding request, represented by row 610*c*, is only 1344 ms. The difference in these two durations, 4 ms, is the network/middleware latency, and that value for each callout, is displayed in column 620*n*.

The exemplary report 600 illustrated by FIG. 6, therefore, provides a user with a detailed view into the performance of the entire execution chain (or at least every monitored application component within the chain). Additionally, in accordance with some embodiments, the report can provide additional information, such as the supplemental information shown in rows 615*a* and 615*b*. This supplemental information will be implementation-dependent, and various embodiments will allow application component developers to return a variety of different types of supplemental information, depending on the nature of the task at hand.

Figure 7:
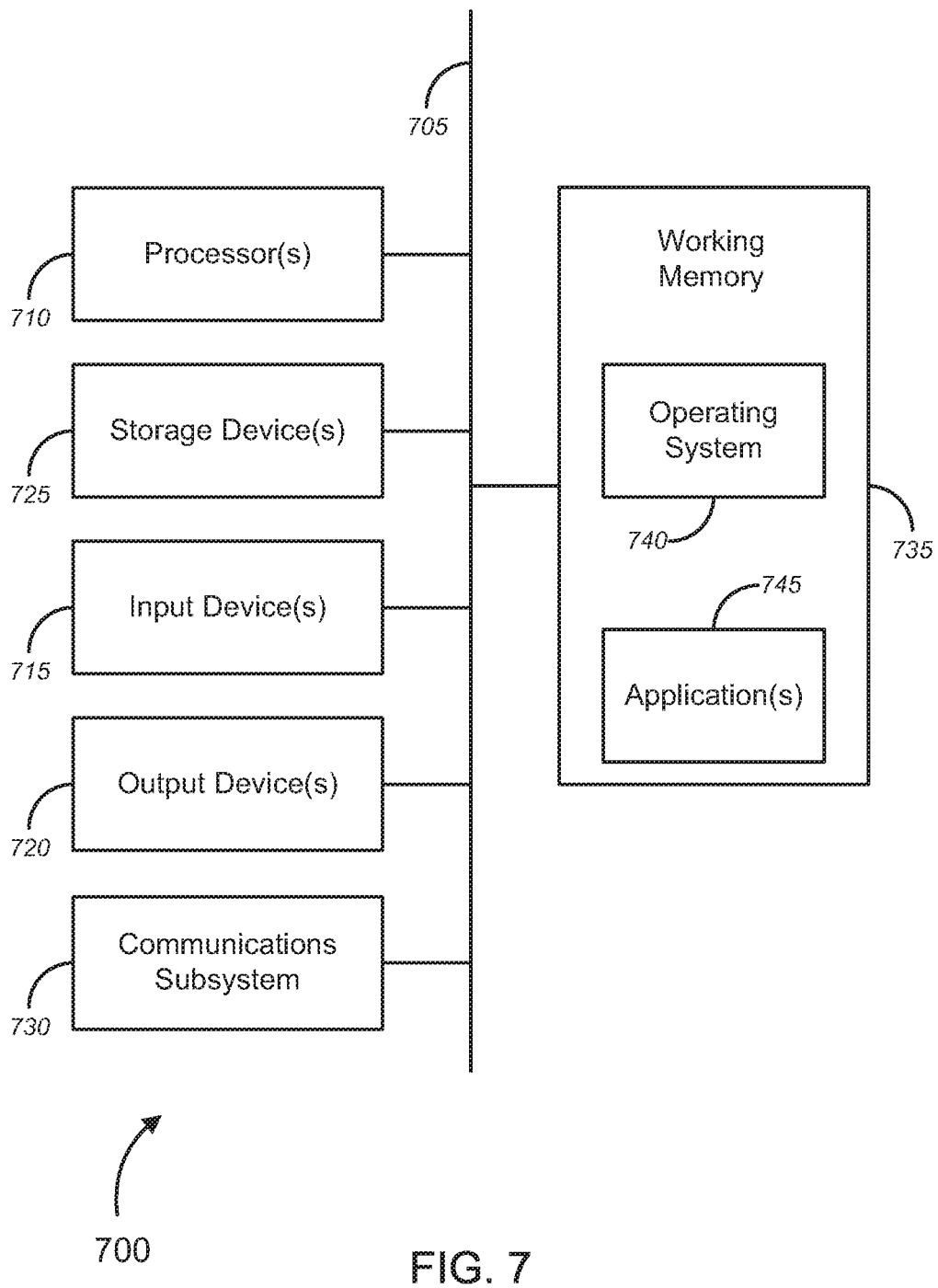
FIG. 7 is a generalized schematic diagram illustrating a computer system, in accordance with various embodiments.

FIG. 7 provides a schematic illustration of one embodiment of a computer system 700 that can perform the methods provided by various other embodiments, as described herein, and/or can function as an application server, database server, web server, web client, and/or the like. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special purpose processors (such as digital signal processing chips, graphics acceleration processors, and/or the like); one or more input devices 715, which can include without limitation a mouse, a keyboard and/or the like; and one or more output devices 720, which can include without limitation a display device, a printer and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer systems, and/or with any other devices described herein. In many embodiments, the computer system 700 will further comprise a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
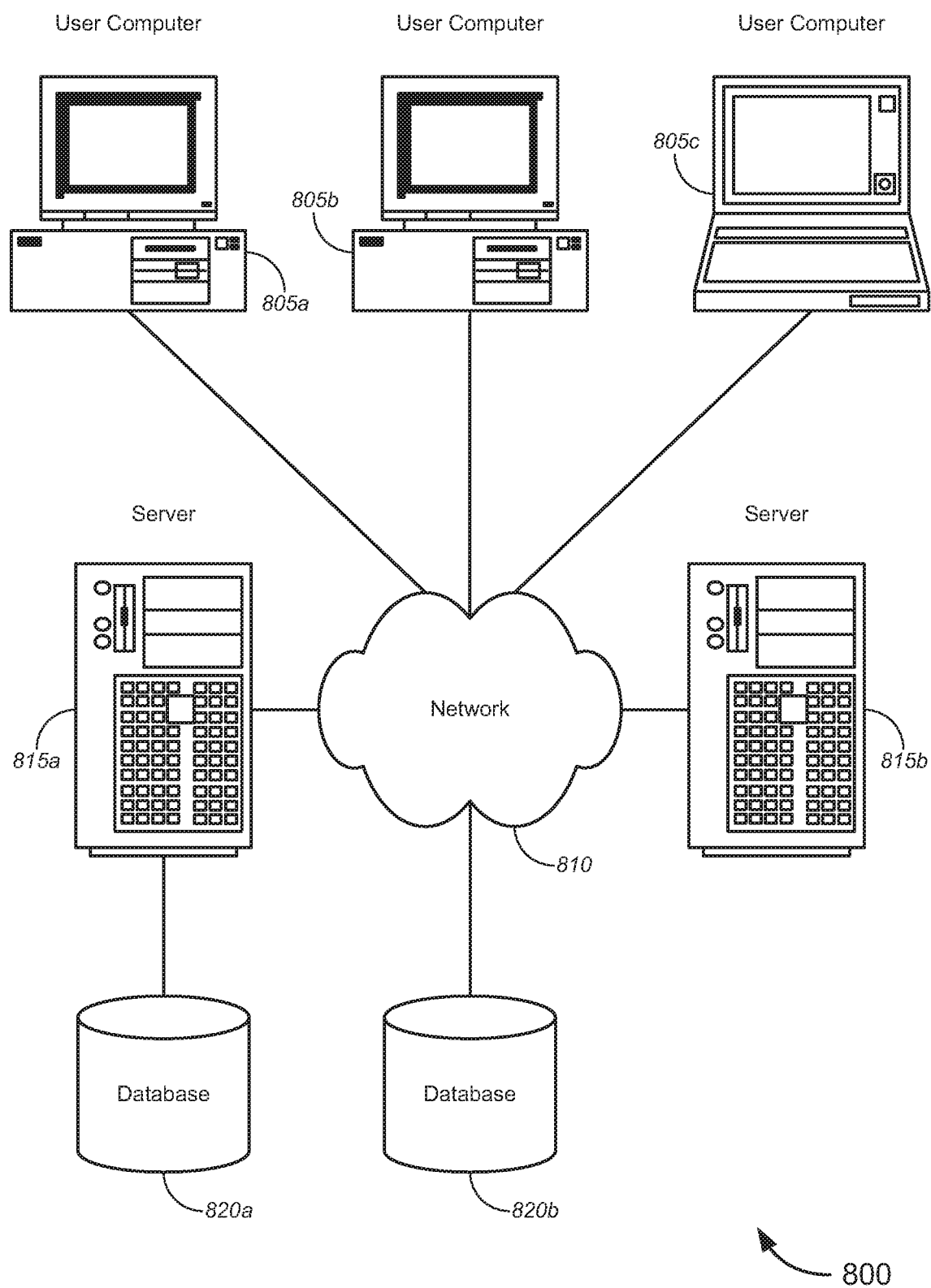
FIG. 8 is a block diagram illustrating a networked system of computers, which can be used in accordance with various embodiments.

As noted above, a set of embodiments comprises systems for tracking application performance. FIG. 8 illustrates a schematic diagram of a system 800 that can be used in accordance with one set of embodiments. The system 800 can include one or more user computers 805. A user computer 805 can be a general purpose personal computer (including, merely by way of example, desktop computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 805 can also have any of a variety of applications, including one or more applications configured to perform methods provided by various embodiments (as described above, for example), as well as one or more office applications, database client and/or server applications, and/or web browser applications. Alternatively, a user computer 805 can be any other electronic device, such as a thin-client computer, Internet-enabled mobile telephone, and/or personal digital assistant, capable of communicating via a network (e.g., the network 810 described below) and/or of displaying and navigating web pages or other types of electronic documents. Although the exemplary system 800 is shown with three user computers 805, any number of user computers can be supported.

Certain embodiments operate in a networked environment, which can include a network 810. The network 810 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 810 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 815. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 may be a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 805 and/or another server 815. In some embodiments, an application server can create web pages dynamically for displaying the information in accordance with various embodiments. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 815a (and/or a user computer 805). Alternatively, a database 820b can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 835 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for establishing a framework for end-to-end traceability and performance monitoring of an execution chain, the method comprising:
   receiving, at a first application component, a request for processing;
   measuring a first start time of the first application component;
   calling an application programming interface ("API") to a tracking framework, which transmits a first object to a tracking server, the first object creating in a database at the tracking server a first request record comprising the first start time, the first request record indicating start of execution of the first application component;
   measuring a second start time of an application callout;
   calling the API, which transmits, to the tracking server, a second object that creates a callout record in the database, the callout record comprising the second start time and indicating that the first application component has initiated an application callout to a second application component;
   establishing a parent-child relationship in the database between the first request record and the callout record, wherein the parent-child relationship between the first request record and the callout record comprises assigning a first Record ID of the first request record as the Parent ID of the callout record when generating and/or storing the callout record;
   sending application data from the first application component to the second application component;
   storing, in the callout record, traceability data about the application data sent from the first application component to the second application component;
   measuring a third start time of execution of the second application component;
   calling the API to transmit a third object, the third object creating, in the database, a second request record comprising the third start time;
   establishing, in the database, a parent-child relationship between the callout record and the second request record, wherein establishing a parent-child relationship between the callout record and the second request record comprises assigning a Record ID of the callout record as the Parent ID of the request record when generating and/or storing the second request record;
   measuring a first stop time of the second application component after execution but before the second application passes a response to the first application component;
   storing the first stop time in the second request record;
   measuring a second stop time of the application callout after the first application component receives a response from the called application;
   storing the second stop time in the callout record;
   measuring a third stop time of the first application component, after the first application component returns a response to the request for processing; and
   storing the third stop time in the first request record.

2. The method of claim 1, wherein the request for processing is a first request in the execution chain, and wherein a Parent ID field is blank for the first request in an execution chain.

3. The method of claim 1, wherein creating the first request record in the database comprises generating and the first request record in the database, and wherein creating the callout record in the database comprises generating and storing the callout record in the database.

4. The method of claim 1, further comprising:
   storing a plurality of request records and a plurality of callout records.

5. The method of claim 4, further comprising:
   analyzing the stored request records and callout records to determine one or more request durations and one or more callout durations.

6. The method of claim 4, further comprising:
   analyzing the stored request records and callout records to identify a trace of execution between the first application component and the second application component.

7. The method of claim 1, wherein the first application component is a first application layer of a first application, and wherein the second application component is a second application layer of the first application.

8. The method of claim 1, wherein the first application component is a first application, and wherein the second application component is a second application.

9. The method of claim 1, wherein the application data comprises a message from the first application component to the second application component.

10. The method of claim 1, further comprising:
    generating traceability data for a first application component before the first application component sends application data to a second application component.

11. The method of claim 10, wherein the traceability data comprises one or more identifiers selected from the group consisting of: a request record identifier ("ID"), a callout record ID, a correlation ID and user interface ("UI") session ID.

12. The method of claim 10, further comprising sending the traceability data from the first component to the second application component using a protocol-specific header of a protocol used to transmit the application data.

13. The method of claim 12, wherein the protocol-specific header is selected from the group consisting of an HTTP header, a SOAP header, an Information Bus header, and a JMS header.

14. The method of claim 10, further comprising placing the traceability data on a message queue.

15. The method of claim 1, further comprising:
    assigning a correlation identifier to the first request record to identify an instance of the application;
    assigning the correlation identifier to the callout record; and
    assigning the correlation identifier to the second request record.

16. The method of claim 1, further comprising:
    maintaining an end-to-end execution chain between the first application component and the second application component, using traceability data, the traceability data including traceability data for each of the first application component, the second application component, and any intermediate application components of the end-to-end execution chain.

17. The method of claim 1, further comprising:
generating a report comprising an end-to-end execution chain, the report listing an actual execution time attributable to each application component in the end-to-end execution chain in processing each request, wherein the actual execution time, for each request by each application component, is measured by adding a pre-callout processing time and a post-callout processing time, the pre-callout processing time being measured by measuring a difference between a start time of each application component and a start time of a subsequent application callout, and the post-callout processing time being measured by measuring a difference between a stop time of the subsequent callout and a stop time of each request.

18. The method of claim 1, wherein the API transmits the first object to the tracking server after the third stop time has been measured, and wherein storing the third stop time in the first request record comprises updating the first object with the third stop time before transmitting the first object to the tracking server.

19. A computer system, comprising:
one or more processors; and
one or more non-transitory computer-readable storage media having encoded thereon one or more sets of instructions executable by one or more computers to perform one or more operations, the one or more sets of instructions collectively comprising instructions executable to:
receive, at a first application component, a request for processing;
measure a first start time of the first application component;
call an application programming interface ("API") to a tracking framework, which transmits a first object to a tracking server, the first object creating in a database at the tracking server a first request record comprising the first start time, the first request record indicating start of execution of the first application component;
measure a second start time of an application callout;
call the API, which transmits, to the tracking server, a second object that creates a callout record in the database, the callout record comprising the second start time and indicating that the first application component has initiated an application callout to a second application component;
establish a parent-child relationship in the database between the first request record and the callout record, wherein the parent-child relationship between the first request record and the callout record comprises assigning a first Record ID of the first request record as the Parent ID of the callout record when generating and/or storing the callout record;
send application data from the first application component to the second application component;
store, in the callout record, traceability data about the application data sent from the first application component to the second application component;
measure a third start time of execution of the second application component;
call the API to transmit a third object, the third object creating, in the database, a second request record comprising the third start time;
establish, in the database, a parent-child relationship between the callout record and the second request record, wherein establishing a parent-child relationship between the callout record and the second request record comprises assigning a Record ID of the callout record as the Parent ID of the request record when generating and/or storing the second request record;
measure a first stop time of the second application component after execution but before the second application passes a response to the first application component;
store the first stop time in the second request record;
measure a second stop time of the application callout after the first application component receives a response from the called application;
store the second stop time in the callout record;
measure a third stop time of the first application component, after the first application component returns a response to the request for processing; and
store the third stop time in the first request record.

20. An apparatus, comprising:
one or more non-transitory computer-readable storage media having encoded thereon one or more sets of instructions executable by one or more computers to perform one or more operations, the one or more sets of instructions collectively comprising instructions executable to:
receive, at a first application component, a request for processing;
measure a first start time of the first application component;
call an application programming interface ("API") to a tracking framework, which transmits a first object to a tracking server, the first object creating in a database at the tracking server a first request record comprising the first start time, the first request record indicating start of execution of the first application component;
measure a second start time of an application callout;
call the API, which transmits, to the tracking server, a second object that creates a callout record in the database, the callout record comprising the second start time and indicating that the first application component has initiated an application callout to a second application component;
establish a parent-child relationship in the database between the first request record and the callout record, wherein the parent-child relationship between the first request record and the callout record comprises assigning a first Record ID of the first request record as the Parent ID of the callout record when generating and/or storing the callout record;
send application data from the first application component to the second application component;
store, in the callout record, traceability data about the application data sent from the first application component to the second application component;
measure a third start time of execution of the second application component;
call the API to transmit a third object, the third object creating, in the database, a second request record comprising the third start time;
establish, in the database, a parent-child relationship between the callout record and the second request record, wherein establishing a parent-child relationship between the callout record and the second request record comprises assigning a Record ID of the callout record as the Parent ID of the request record when generating and/or storing the second request record;
measure a first stop time of the second application component after execution but before the second application passes a response to the first application component;
store the first stop time in the second request record;
measure a second stop time of the application callout after the first application component receives a response from the called application;
store the second stop time in the callout record;
measure a third stop time of the first application component, after the first application component returns a response to the request for processing; and
store the third stop time in the first request record.

* * * * *